(12) United States Patent
Lee et al.

(10) Patent No.: US 11,954,868 B2
(45) Date of Patent: *Apr. 9, 2024

(54) SCALED HUMAN VIDEO TRACKING

(71) Applicant: ObjectVideo Labs, LLC, Tysons, VA (US)

(72) Inventors: Sung Chun Lee, Tysons, VA (US); Gang Qian, McLean, VA (US); Sima Taheri, McLean, VA (US); Sravanthi Bondugula, Vienna, VA (US); Allison Beach, Leesburg, VA (US)

(73) Assignee: ObjectVideo Labs, LLC, Tysons, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/963,768

(22) Filed: Oct. 11, 2022

(65) Prior Publication Data

US 2023/0030884 A1    Feb. 2, 2023

Related U.S. Application Data

(63) Continuation of application No. 17/069,445, filed on Oct. 13, 2020, now Pat. No. 11,494,935.

(Continued)

(51) Int. Cl.
*G06T 7/73*        (2017.01)
*G06F 18/213*    (2023.01)
(Continued)

(52) U.S. Cl.
CPC ............ *G06T 7/246* (2017.01); *G06F 18/213* (2023.01); *G06T 7/73* (2017.01); *G06T 11/20* (2013.01); *G06V 20/52* (2022.01); *G06V 40/103* (2022.01); *G06T 2207/30196* (2013.01); *G06T 2210/12* (2013.01)

(58) Field of Classification Search
CPC ..... G06T 3/40; G06T 7/10; G06T 7/11; G06T 7/194; G06T 7/70; G06T 7/73; G06T 2207/30196; G06T 2207/30232; G06T 2210/12; G06V 10/22; G06V 10/25; G06V 10/32; G06V 10/44; G06V 20/52; G06V 40/103
See application file for complete search history.

(56) References Cited

U.S. PATENT DOCUMENTS 9,210,336 B2   12/2015   Scanlon et al.
9,547,908 B1    1/2017   Kim et al.
(Continued)

*Primary Examiner* — Andrew W Johns
(74) *Attorney, Agent, or Firm* — Fish & Richardson P.C.

(57) ABSTRACT

Methods, systems, an apparatus, including computer programs encoded on a storage device, for tracking human movement in video images. A method includes obtaining a first image of a scene captured by a camera; identifying a bounding box around a human detected in the first image; determining a scale amount that corresponds to a size of the bounding box; obtaining a second image of the scene captured by the camera after the first image was captured; and detecting the human in the second image based on both the first image scaled by the scale amount and the second image scaled by the scale amount. Detecting the human in the second image can include identifying a second scaled bounding box around the human detected in the second image scaled by the scale amount.

20 Claims, 4 Drawing Sheets

Related U.S. Application Data

(60) Provisional application No. 62/916,434, filed on Oct. 17, 2019.

(51) Int. Cl.
  G06T 7/246   (2017.01)
  G06T 11/20   (2006.01)
  G06V 20/52   (2022.01)
  G06V 40/10   (2022.01)

(56)     References Cited

U.S. PATENT DOCUMENTS

| | | |
|---|---|---|
| 10,133,947 B2 | 11/2018 | Yang et al. |
| 10,645,344 B2 | 5/2020 | Marman et al. |
| 10,657,364 B2 | 5/2020 | El-Khamy et al. |
| 11,494,935 B2 * | 11/2022 | Lee et al. ............... G06T 11/20 |
| 2007/0147700 A1 | 6/2007 | Jeong et al. |
| 2019/0304102 A1 | 10/2019 | Chen et al. |
| 2021/0357640 A1 * | 11/2021 | Li ........................ G06T 5/30 |
| 2021/3657074 | 11/2021 | Mao et al. |
| 2022/0474941 | 1/2022 | Tanaka et al. |

* cited by examiner

SCALED HUMAN VIDEO TRACKING

CROSS-REFERENCE TO RELATED APPLICATIONS

This application is a continuation of U.S. patent application Ser. No. 17/069,445, filed Oct. 13, 2020, now allowed, which claims the benefit of the U.S. Provisional Patent Application No. 62/916,434 filed Oct. 17, 2019. All of these prior applications are incorporated herein by reference in their entirety.

TECHNICAL FIELD

This disclosure application relates generally to surveillance cameras.

BACKGROUND

Many properties are equipped with monitoring systems that include sensors and connected system components. Some residential-based monitoring systems include cameras.

SUMMARY

Techniques are described for scaled human video tracking.

Many residents and homeowners equip their properties with monitoring systems to enhance the security, safety, or convenience of their properties. A property monitoring system can include cameras that can obtain visual images of scenes at the property. A camera can be incorporated into a component of the property monitoring system, such as a doorbell.

A doorbell camera can detect objects and track object movement within a field of view. For example, a doorbell camera with a field of view that includes a front yard of a property can track movement of objects, e.g., humans, in the front yard. In some examples, movement detected by doorbell cameras can trigger a property monitoring system to perform one or more actions. For example, movements of humans that meet pre-programmed criteria may trigger the property monitoring system to send a notification to a resident of the property or to adjust a setting of the property monitoring system. Example criteria can include a human approaching the property within a certain range or at a certain speed, a threshold number of humans approaching the property, and/or a human approaching the property late at night.

A doorbell camera can capture images of a scene and identify objects, or targets, to be tracked within the field of view. In some examples, a target can be a human. A doorbell camera can use video tracking to associate targets in consecutive video images, or frames. Specifically, a doorbell camera can use video tracking to identify a location of one or more human targets in a frame, and to predict locations of the human targets in a subsequent frame. To perform human video tracking, a doorbell camera can include a human detector and a human tracker. In some examples, the human detector and the human tracker can run on a computing system within the doorbell camera, without transferring video data to an external computing system.

Doorbell cameras may perform human video tracking by identifying bounding boxes around human targets within frames. The bounding boxes can include feature points within the bounding boxes. A feature point may be one or more points in an image that are mapped to a coordinate system. Values of pixels at or around the feature point can be matched to values of pixels in another image.

For example, a feature point may be mapped to a coordinate at [x, y] in an image, where x can represent a horizontal number of pixels and y can represent a vertical number of pixels. The pixels at or around the coordinate [x, y] can include, for example, a 3-by-3 square of pixels. Values of the pixels can include red, green, and blue pixel values. A human tracker can attempt to match the red, green, and blue pixel values in the 3-by-3 square of pixels with red, green, and blue values of another 3-by-3 square of pixels in another image. In this way, the feature points can be used for matching and comparing features of a first frame to features of a second frame.

In some examples, doorbell cameras can use bounding boxes to track lateral movement of targets across the field of view, e.g., from left to right. When tracking lateral movement of a target across the field of view, the size of a bounding box may remain approximately constant for each frame. In some examples, doorbell cameras can use bounding boxes to track movement of targets toward or away from the doorbell camera. When tracking movement toward or away from the doorbell camera, the size of a bounding box may increase or decrease between frames. Due to the changes in bounding box size, doorbell camera tracking may be less accurate, or robust, when tracking movement toward or away from the doorbell camera, than when tracking lateral movement across the field of view.

A doorbell camera can improve tracking accuracy by downscaling a bounding box to a smaller size. The doorbell camera can downscale a bounding box, for example, to a size that experimentally results in greater tracking robustness. The doorbell camera can downscale the bounding box by applying an image scale factor to the frame. The image scale factor can be selected based on the initial bounding box size.

A doorbell camera can improve tracking accuracy by applying masks to detected targets in a frame. For example, the doorbell camera can apply a standing mask, approximating a shape of a standing human, to a human target in an upright position. The doorbell camera can apply a torso mask, approximating a shape of a human torso, to a human target in a sitting position, or to a human target that is visible above the waist. In general, masks can more closely outline human targets than bounding boxes. The doorbell camera can match feature points within the masks between a first frame and a second frame to more accurately track movement of human targets.

The details of one or more implementations of the subject matter described in this specification are set forth in the accompanying drawings and the description below. Other features, aspects, and advantages of the subject matter will become apparent from the description, the drawings, and the claims.

DETAILED DESCRIPTION

Figure 1:
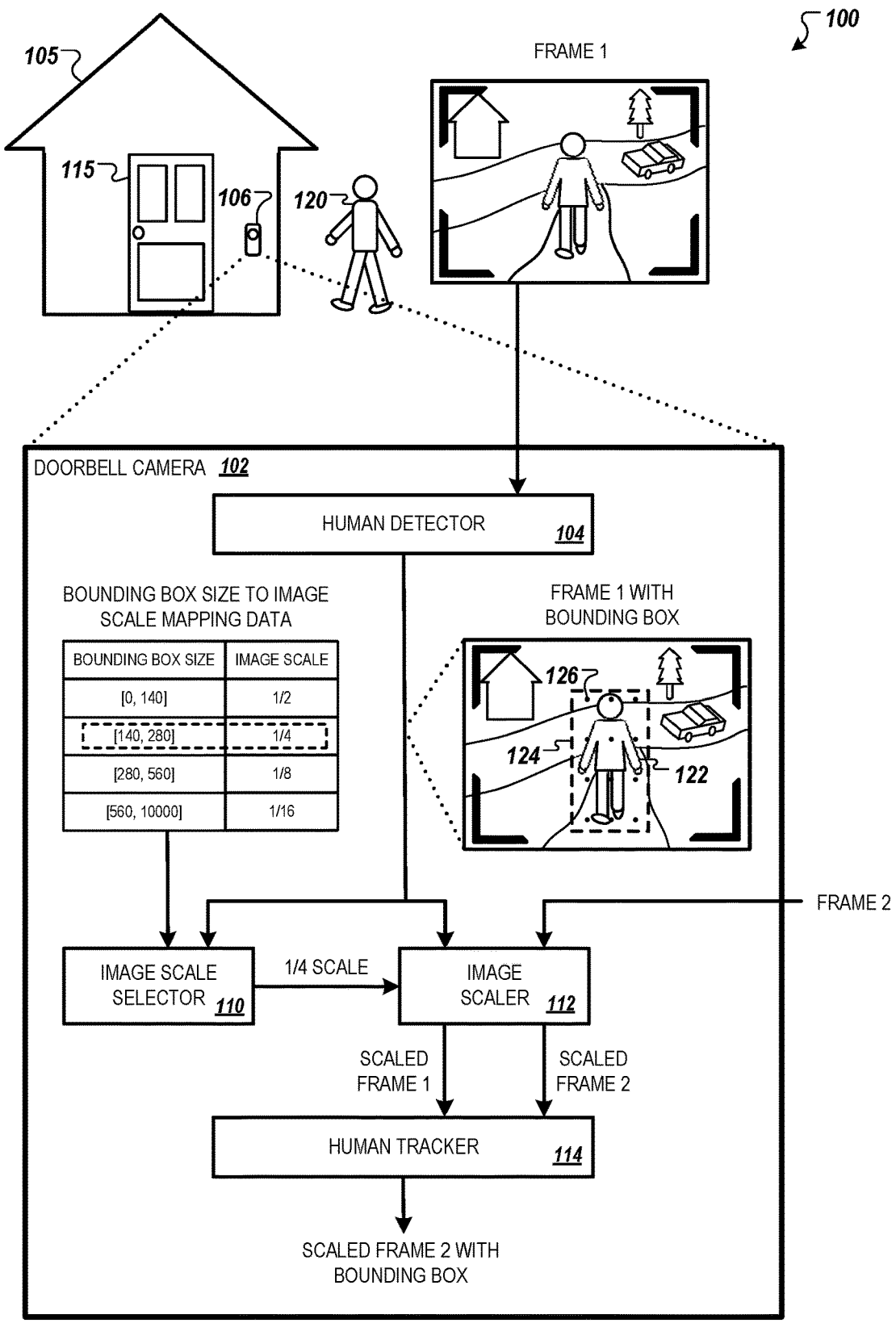
FIG. 1 illustrates an example system for scaled human video tracking using a doorbell camera.

FIG. 1 illustrates an example system 100 for scaled human video tracking using a doorbell camera. In FIG. 1, a doorbell camera 102 is installed at a property 105. The property 105 can be a home, another residence, a place of business, a public space, or another facility that has one or more doorbell cameras 102 installed. The doorbell camera 102 is a component of a doorbell 106 that is installed external to the property 105. The doorbell 106 is installed near a front door 115 of the property 105. In some examples, the doorbell 106 is a component of a home monitoring system that collects data from various sensors to monitor conditions and events at the property 105.

In addition to the doorbell camera 102, the doorbell 106 may include other components and sensors. For example, the doorbell 106 may include a button that, when depressed, causes an audible tone to sound at the property 105. The doorbell 106 may also include additional sensors, e.g., a motion sensor, temperature sensor, light sensor, and a microphone.

The doorbell camera 102 captures video from a scene within a field of view. The video includes multiple sequential images, or frames. The video can include any type of images. For example, the video can include visual light images, infrared images, or radio wave images. In some examples, the video can include a combination of one or more types of images, e.g., visual light images with infrared illumination.

The field of view is an area that is observable by the doorbell camera 102. The doorbell camera 102 has a field of view that includes the area in front of the property 105. For example, the field of view can include a front yard, walkway, and street in front of the property 105.

In some examples, the doorbell camera 102 can capture video continuously. In some examples, the doorbell camera 102 can capture video when triggered by an event. For example, the doorbell camera 102 may capture video when triggered by depression of the button on the doorbell 106. In some examples, the doorbell camera 102 may capture video when triggered by activation of the motion sensor or other sensor of the doorbell 106.

The doorbell camera 102 may capture video for a preprogrammed amount of time. For example, when triggered by depression of the button on the doorbell 106, the doorbell camera 102 may capture video for a preprogrammed time of 10 seconds, 30 seconds, or 60 seconds. When triggered by a motion sensor, the doorbell camera 102 may capture video for a preprogrammed time and/or may capture video until the motion sensor no longer detects motion.

The doorbell camera 102 can perform video analysis on captured video. Video analysis can include detecting, identifying, and tracking objects, or targets, in the video. The doorbell camera 102 includes a human detector 104 that can detect the presence of a human target within a frame. When the human detector 104 detects a human target, the human detector 104 can identify a bounding box around the image of the human in the frame. The doorbell camera 102 includes a human tracker 114 that can track human movement from one frame to a next frame. The human tracker 114 can track the bounding boxes of existing human targets in each subsequent frame.

Operations of the human detector 104 may require more computation time than operations of the human tracker 114. Therefore, the doorbell camera 102 may run the human detector 104 less frequently than the human tracker 114. For example, the doorbell camera 102 may run the human detector 104 by providing captured frames to the human detector 104 every third frame, every fifth frame, or every tenth frame. The doorbell camera 102 may run the human tracker 114 more frequently than the human detector 104. For example, the doorbell camera 102 may provide captured frames to the human tracker 114 on every frame that the human detector 104 is not run on, or on every other frame that the human detector 104 is not run on.

In the example of FIG. 1, a visitor 120 approaches the front door 115 of the property 105. The doorbell camera 102 captures video that includes Frame 1. The doorbell camera 102 may capture the video including Frame 1, for example, upon one or more of being triggered by a motion sensor that detects the motion of the visitor 120, as part of a constant capturing of frames, or upon a doorbell button being pressed. Frame 1 includes an image of the visitor 120. Frame 1 also includes images of background objects, including a vehicle, a house, a tree, a street, and a walkway.

The human detector 104 receives Frame 1, including the image of the visitor 120. The human detector 104 identifies the image of the visitor as a human target 122. The human detector 104 identifies a bounding box 124 around the human target 122. The bounding box 124 can be an area of the frame where the human target 122 is positioned. The bounding box 124 can coarsely outline the human target 122 using, for example, a rectangular shape with a height and a width.

The bounding box 124 includes the human target 122 within the perimeter of the bounding box 124. The bounding box 124 also includes images of background objects within the perimeter of the bounding box 124. For example, the bounding box 124 includes portions of images of the walkway and the street. The bounding box 124 excludes images of other background objects, including images of the vehicle, the house, and the tree.

The bounding box 124 includes feature points 126. A feature point 126 may be one or more points in an image that are mapped to a coordinate system. Values of pixels at or around the feature point 126 can be matched to values of pixels in another image. The pixels at or around the feature point 126 can include, for example, a 3-by-3 square of pixels. Values of the pixels can include red, green, and blue pixel values. A human tracker can attempt to match the red, green, and blue pixel values in the 3-by-3 square of pixels with red, green, and blue values of another 3-by-3 square of pixels in another image. Thus, the feature points 126 can be used for tracking features of objects between frames.

In some examples, the feature points can be arranged in a uniform grid pattern within a bounding box. A larger bounding box may have sparser feature points. Feature points that are too sparse can be insufficient for tracking target movement. Sparser feature points can cause missing feature matches and lead to tracking failure. A smaller bounding box may have denser feature points. Feature points that are too dense may overlap. Denser feature points can cause false feature matches and also lead to tracking failure.

The human detector 104 outputs Frame 1 with the bounding box 124 to an image scale selector 110 and to an image scaler 112. The image scale selector 110 selects a scale for adjusting the size of Frame 1. The image scale selector 110 receives bounding box size to image scale mapping data ("mapping data"). The mapping data maps various ranges of bounding box sizes to corresponding scale factors. The corresponding scale factors are the factors by which the frame is to be downscaled for improved human tracking.

Bounding box sizes can be measured by any appropriate dimension, e.g., width, height, or area. In the example of FIG. 1, the doorbell camera 102 measures bounding box sizes by width, e.g., the number of pixels across the width of a bounding box. According to the mapping data, the corresponding image scale factor for a bounding box width of between zero and one hundred forty pixels is ½. The corresponding image scale factor for a bounding box width of between one hundred forty and two hundred eighty pixels is ¼. The corresponding image scale factor for a bounding box width of between two hundred eighty and five hundred sixty pixels is ⅛. The corresponding image scale factor for a bounding box width of between five hundred sixty and ten thousand pixels is 1/16.

The mapping data can be pre-programmed into the doorbell camera 102. In some examples, the mapping data can be based on experimental results. In some examples, the mapping data may be based on downscaling bounding boxes to a size that results in improved robustness. Robustness is a measure of human tracker performance based on a number of times that a tracker fails over a given experiment length. In the example of FIG. 1, based on experimental results, the mapping data is based on reducing bounding boxes to an approximate width of seventy pixels.

In some examples, a bounding box can be scaled to adjust the density of feature points within the bounding box. For example, a bounding box can be scaled to adjust the density of feature points to a value of one feature point per fifty pixels, one feature point per one hundred pixels, etc. The mapping data may be based on adjusting feature point density to a designated value, or a range of values. For example, experimental results may show improved robustness when bounding boxes have a feature point density of one feature point per one hundred pixels. Therefore, the mapping data can be based on reducing bounding boxes to sizes that have a feature point density of approximately one feature point per one hundred pixels.

In some examples, a bounding box can be scaled to adjust the number of feature points within the bounding box. For example, a bounding box can be scaled to adjust the number of feature points to a value of fifty feature points in the bounding box, one hundred feature points in the bounding box, etc. The mapping data may be based on adjusting the number of feature points within the bounding box to a designated value, or range of values. For example, experimental results may show improved robustness when bounding boxes include one hundred feature points. Therefore, mapping data can be based on reducing bounding boxes to sizes that include approximately one hundred feature points.

The image scale selector 110 selects the appropriate image scale factor for the bounding box 124 based on the mapping data. For example, the image scale selector 110 may determine that the bounding box 124 has a width of two hundred pixels. The bounding box 124 therefore has a width between one hundred forty and two hundred eighty pixels. Thus, the image scale selector 110 selects the corresponding image scale factor of ¼ from the mapping data.

The image scale selector 110 outputs the selected image scale factor of ¼ to the image scaler 112. The image scaler 112 also receives Frame 1 with the bounding box 124 from the human detector 104. The image scaler 112 applies the image scale factor of ¼ to Frame 1. The image scaler 112 outputs the scaled Frame 1 to the human tracker 114. The scaled Frame 1 includes a bounding box of ¼ the initial bounding box size of two hundred pixels. Thus, the scaled Frame 1 includes a bounding box having a width of fifty pixels.

In some examples, the image scaler 112 may downscale only the portion of Frame 1 that is within the bounding box 124. The image scaler 112 can then output only the portion of Frame 1 that is within the bounding box 124 to the human tracker 114.

In some examples, upon receiving Frame 1 with the bounding box 124 from the human detector 104, the image scaler 112 may downscale Frame 1 using each of the image scale factors, e.g., ½, ¼, ⅛, and 1/16. The image scaler 112 may therefore generate a scaled Frame 1 at each scale size of ½, ¼, ⅛, and 1/16. The image scale selector 110 selects the scale factor of ¼ based on the mapping data, as described above. The image scale selector 110 outputs the selected scale factor ¼ to the image scaler 112. Based on receiving the selected scale factor ¼ from the image scale selector 110, the image scaler 112 can select to output the previously generated ¼ scaled Frame 1 to the human tracker 114.

The doorbell camera 102 continues to capture subsequent frames, including Frame 2. Frame 2 includes an image of the visitor 120. As the visitor 120 continues to approach the front door 115, the image of the visitor 120 is expected to occupy a larger area of Frame 2 than in Frame 1.

As described above, due to increased computation time, the doorbell camera 102 might not run the human detector 104 on Frame 2. In this case, the image scaler 112 receives Frame 2. Based on the image scale factor ¼ selected for Frame 1, the image scaler 112 also applies the image scale factor of ¼ on Frame 2. The image scaler 112 outputs scaled Frame 2 to the human tracker 114.

The human tracker 114 tracks movement of the human target 122 between scaled Frame 1 and scaled Frame 2. The human tracker 114 can track movement of the human target 122, for example, by searching scaled Frame 2 for feature points that match the human target 122. In some examples, in order to predict the position and size of the human target 122 in scaled Frame 2, the human tracker 114 can search a candidate area of scaled Frame 2, e.g., an area of scaled Frame 2 that corresponds to the scaled bounding box 124 of scaled Frame 1, for feature points that match the human target 122.

The human tracker 114 attempts to match each feature point 126 between the scaled Frame 1 and scaled Frame 2. Both scaled Frame 1 and scaled Frame 2 are scaled to a size that results in an improved density of feature points 126. Thus, by tracking the human target 122 between scaled Frame 1 and scaled Frame 2, the human tracker 114 has an improved robustness compared to tracking the human target 122 between full sized Frame 1 and Frame 2.

The human tracker 114 locates the human target 122 in the scaled Frame 2. The human tracker 114 identifies a bounding box around the human target 122. Since the visitor 120 is approaching the front door 115, the visitor 120 is expected to be nearer to the doorbell camera 102 in Frame 2 than in Frame 1. Thus, the human target 122 is likely larger in Frame 2 than in Frame 1. Therefore, the human tracker 114 identifies a bounding box in Frame 2 that is larger than the bounding box 124 in Frame 1. The human tracker 114 outputs scaled Frame 2 with the larger bounding box.

The image scaler 112 can continue to receive subsequent frames, e.g., Frame 3, Frame 4, etc., and can apply the same image scale factor of ¼ to the subsequent frames. The human tracker 114 can continue to track the human target 122 until the doorbell camera 102 runs the human detector 104 on a following frame, and/or until the human target 122 no longer appears in the field of view.

Figure 2:
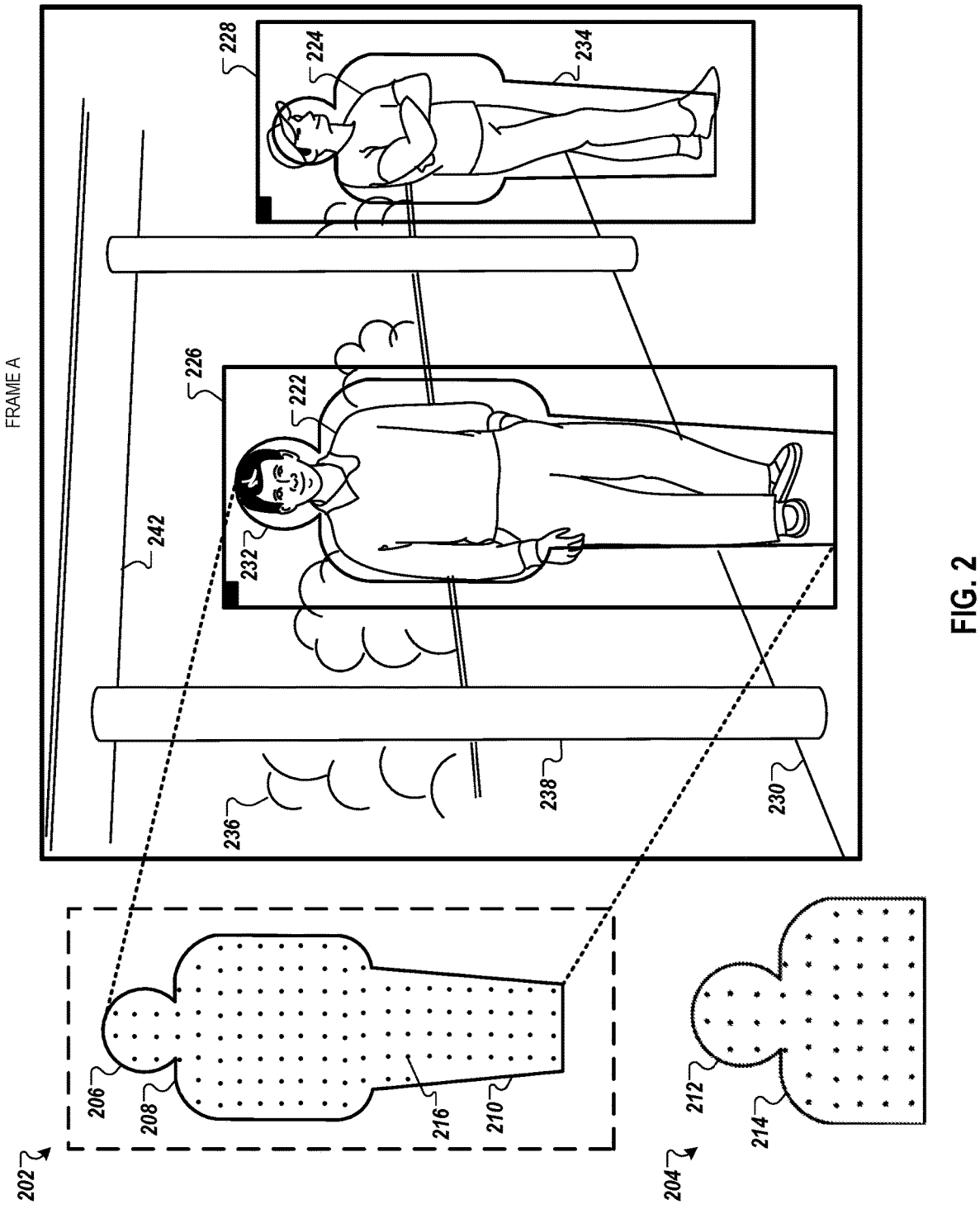
FIG. 2 illustrates example masks that can be used for detecting and tracking humans.

FIG. 2 illustrates example masks 202, 204 that can be used for detecting and tracking humans in frames. A doorbell camera, e.g., the doorbell camera 102, can use the masks 202, 204 to improve the accuracy of tracking human targets in frames.

As described above, when a human detector detects a human target in a frame, the human detector can identify a bounding box around the human target. The bounding box is typically a rectangular shape that coarsely outlines the human target. The bounding box can include feature points that can be used to track image features between frames. In some examples, feature points can be arranged in a uniform grid pattern within the bounding box.

When a human detector identifies a rectangular bounding box around a human target, some feature points within the perimeter of the bounding box may not correspond to features of the human target. Some feature points within the perimeter of the bounding box may correspond to features of a background object.

Additionally, a rectangular bounding box may include large areas of background color within the perimeter of the bounding box. For example, a rectangular bounding box may include green grass on both sides of a human target wearing a blue shirt. A human detector and/or a human tracker may use a color histogram to identify features of a human target. The green grass included within the bounding box may skew the color histogram of the human target from blue towards green, reducing the tracking accuracy.

A mask is a shape that can be applied to a target within a bounding box. A mask can be formed in a shape that outlines the target more closely than the bounding box. A mask can include feature points within the perimeter of the mask. The feature points may be arranged in a pattern such as a grid pattern.

Applying masks that approximate shapes of a human target can reduce the effects of background colors on human tracking. In the example described above, a mask will likely include less green grass on both sides of the human target wearing the blue shirt than the rectangular bounding box. Applying the mask can therefore reduce the skewing of the color histogram towards green. Thus, applying masks to human targets can reduce the effects of background colors on the doorbell camera, improving human tracking accuracy.

The example masks 202, 204 can be used for detecting and tracking human targets in frames. The mask 202 approximates a shape of a standing human, while the mask 204 approximates a shape of a human torso. A doorbell camera, e.g., the doorbell camera 102, can apply the masks 202, 204 to one or more human targets to improve the accuracy of tracking human targets in frames.

The mask 202 is an example standing mask. The mask 202 includes a rounded portion 206, a rounded rectangular portion 208, and a tapering rectangular portion 210. The doorbell camera 102 can apply the mask 202 to human targets that are standing, walking, or otherwise in an upright position.

The mask 204 is an example torso mask. The mask 204 includes a rounded portion 212 and a semi-rounded rectangular portion 214. The doorbell camera 102 can apply the mask 202 to human targets that are sitting or that are visible from above the waist. For example, the doorbell camera 102 can apply the mask 202 to human targets that are close in proximity to the doorbell 106, such that only the upper portion of the body is visible.

The masks 202, 204 can each include feature points 216. The feature points 216 are arranged in a pattern, e.g., a uniform grid pattern, within the perimeters of the masks 202, 204. When applied to a human target, the feature points 216 can be used to track features of the human targets between frames.

In some examples, a human detector, e.g., the human detector 104, can apply one of the masks 202, 204 to each human target in a frame. In some examples, a human tracker, e.g., the human tracker 114, can apply one of the masks 202, 204 to each human target in a frame.

For example, the human detector 104 of the doorbell camera 102 may receive Frame A. Frame A includes images of two standing humans. One of the standing humans is positioned within a closer range to the doorbell camera 102, and occupies a larger area of Frame A. Another of the standing humans is positioned at a farther range from the doorbell camera 102, and occupies a smaller area of Frame A. Frame A may also include background images. For example, Frame A includes background images including a platform 230 on which the humans are standing, columns 238, an overhang 242, and foliage 236.

The human detector identifies the images of the two standing humans as human target 222 and human target 224. Since the human target 222 occupies a larger portion of the Frame A than the human target 224, the human detector 104 identifies a larger bounding box 226 around the human target 222. The human detector 104 identifies a smaller bounding box 228 around the human target 224. The bounding boxes 226, 228 are rectangular, and coarsely outline the human targets 222, 224. Because the bounding boxes 226, 228 coarsely outline the human targets 222, 224, portions of Frame A that are within the bounding boxes 226, 228 include images of background objects. For example, each of the bounding boxes 226, 228 include images of the platform 230 and the foliage 236. Each of the bounding boxes 226, 228 exclude images of the columns 238 and the overhang 242. When images of background objects are within the perimeters of the bounding boxes 226, 228, the robustness of human target tracking can be reduced.

The human detector 104 can select to apply a mask to the human targets 222, 224. The human detector 104 can determine that each of the human targets 222, 224 are upright, or standing. The human detector 104 can therefore select to apply the mask 202 to each of the human targets 222, 224.

The human detector 104 can apply a larger mask 232 to the human target 222, and a smaller mask 234 to the human target 224. The smaller mask 234 may include fewer feature points 216 than the larger mask 232. The masks 232, 234 outline the human targets 222, 224 more closely than the bounding boxes 226, 228, respectively. Because the masks 232, 234 outline the human targets 222, 224 more closely than the bounding boxes 226, 228, smaller portions of Frame A that are within the masks 232, 234 include images of background objects.

The doorbell camera 102 can downscale the Frame A, including the bounding boxes 226, 228 and the masks 232, 234, as described above in reference to FIG. 1. The human tracker 114 can receive a scaled Frame A. The human tracker 114 may then receive a scaled next frame.

The human tracker 114 tracks movement of the human targets 222, 224 between the scaled Frame A and the scaled next frame. The human tracker 114 can search the scaled next frame for feature points 216 that match the human targets 222, 224. In some examples, in order to predict the positions and sizes of the human target 222, 224 in the scaled next frame, the human tracker 114 can search candidate areas of the scaled next frame, e.g., areas of the scaled next frame that correspond to the scaled masks 232, 234. The human tracker 114 attempts to match feature points 216 between the scaled Frame A and the scaled next frame.

The human tracker 114 attempts to match feature points 216 within the masks 202, 204, instead of within the bounding boxes 226, 228. The masks 202, 204 include a smaller portion of background images than the bounding boxes 226, 228. Therefore, by using the masks 202, 204, the human tracker 114 can more accurately match the feature points 216 and track the human targets 222, 224 between Frame A and the next frame.

In a process similar to that used by the human detector 104, described above, the human tracker 114 can select to apply one of the masks 202, 204 to human targets in the next frame. In some examples, a human target, e.g., the human target 224, may move away from the doorbell camera 102 between Frame A and the next frame. The human tracker 114 can therefore select to apply a smaller mask 202 to the human target 224 due to the human target 224 occupying a smaller area of the next frame.

In some examples, a human target, e.g., the human target 222, may move toward the doorbell camera 102 between Frame A and the next frame. The human tracker 114 can therefore select to apply a larger mask 202 to the human target 222 due to the human target 222 occupying a larger area of the next frame.

In some examples, a human target, e.g., the human target 222, may move toward the doorbell camera 102 between the Frame A and the next frame, such that only a torso of the human target 222 remains visible to the doorbell camera 102. The human tracker 114 can identify the change in shape of the human target 222 between Frame A and the next frame. The human tracker 114 can therefore select to apply the mask 204 to the human target 222 instead of the mask 202.

Figure 3:
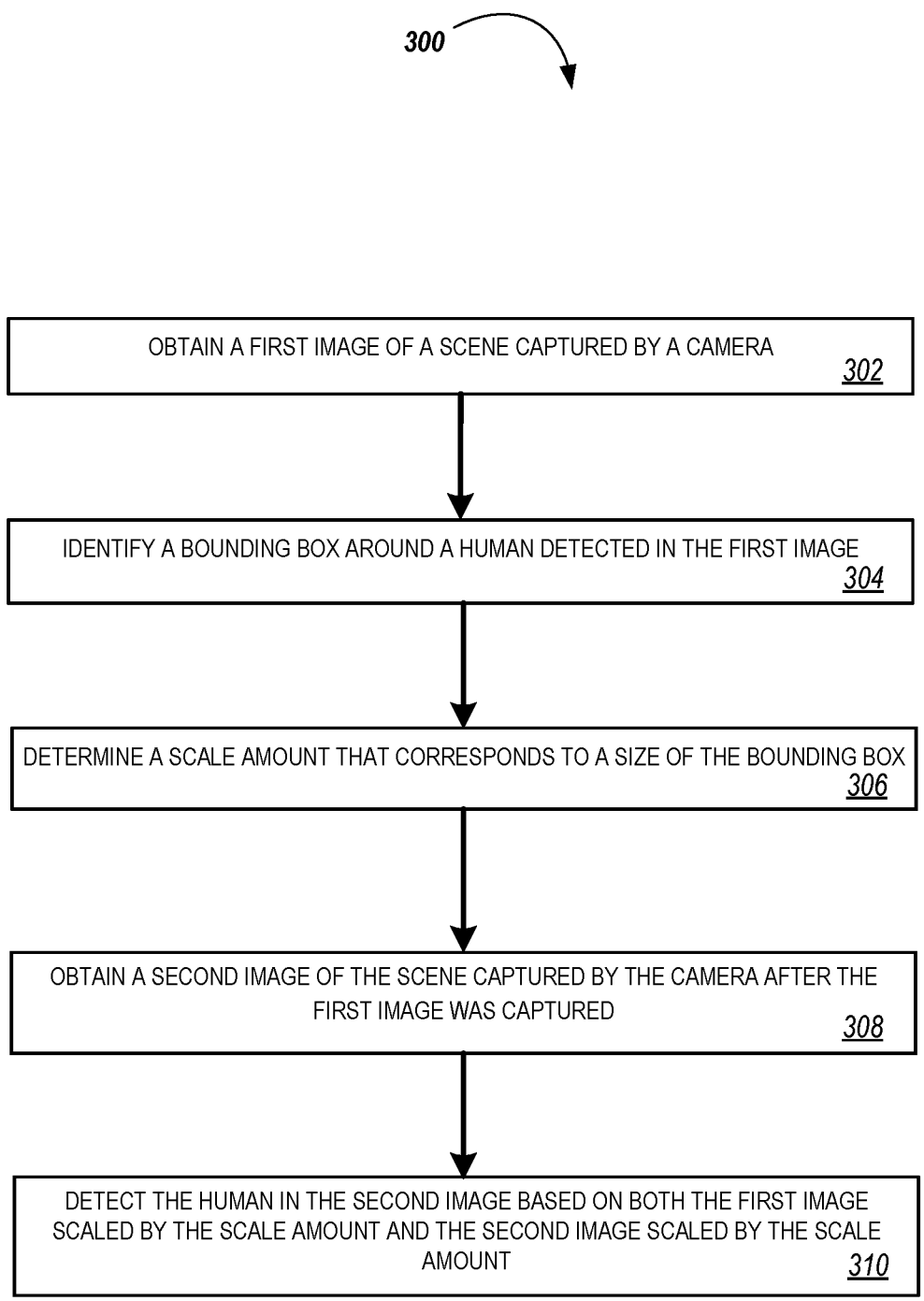
FIG. 3 is a flow chart illustrating an example of a process for scaled human video tracking.

FIG. 3 is a flow chart illustrating an example of a process 300 for scaled human video tracking. The process 300 can be performed by a camera, e.g. the doorbell camera 102. In some implementations, the process 300 can be performed by one or more computer systems that communicate electronically with a camera, e.g., over a network.

Briefly, process 300 includes obtaining a first image of a scene captured by a camera (302), identifying a bounding box around a human detected in the first image (304), determining a scale amount that corresponds to a size of the bounding box (306), obtaining a second image of the scene captured by the camera after the first image was captured (308), and detecting the human in the second image based on both the first image scaled by the scale amount and the second image scaled by the scale amount (310).

In additional detail, the process 300 includes obtaining a first image of a scene captured by a camera (302). The camera can be, for example, the doorbell camera 102. The first image can be, for example, Frame 1. The first image may include images of one or more humans e.g., the visitor 120. The first image may include background images, e.g., of streets, vehicles, or foliage.

The process 300 includes identifying a bounding box around a human detected in the first image (304). Identifying a bounding box around a human detected in the first image may include providing the first image to a human detector and identifying a bounding box indicated by the human detector. For example, Frame 1 is provided to the human detector 104 and the image scale selector 110 determines that the human detector 104 has indicated a bounding box 124 around the human target 122 in Frame 1. The bounding box may be a rectangular shape that coarsely outlines the detected human. The bounding box can include feature points within the perimeter of the bounding box. In some examples, the bounding box can identify a candidate area that can be searched for matching features in a subsequent frame. The bounding box may include fewer images of background objects than are included in the first image.

The bounding box has a bounding box size. The bounding box size can include at least one of a number of pixels along a first dimension or a number of pixels along a second dimension of the bounding box. For example, the size of the bounding box can include a number of pixels along a dimension of the bounding box such as a height, width, or length of the bounding box. In some examples, the size of the bounding box can include a number of pixels along a diagonal of the bounding box, e.g., a dimension extending between a corner of the bounding box and an opposite corner of the bounding box. In some examples, the bounding box size can include an area of the bounding box, e.g., a number of pixels within the bounding box.

An example bounding box has a size of two hundred fifty by five hundred pixels, where two hundred fifty is the number of pixels along the width of the bounding box and five hundred pixels is the number of pixels along the height of the bounding box. In this example, the number of pixels along a diagonal of the bounding box is five hundred fifty-nine pixels, and the area of the bounding box is one hundred twenty-five thousand pixels.

The process 300 includes determining a scale amount that corresponds to a size of the bounding box (306). The doorbell camera can determine the scale amount using an image scale selector, e.g., the image scale selector 110. The image scale selector can measure a size of the bounding box using, for example, a number of pixels along a width of the bounding box.

Determining the scale amount that corresponds to a size of the bounding box can include accessing stored data that maps bounding box sizes to respective scale amounts, and based on the stored data, selecting the scale amount that corresponds to the size of the bounding box. For example, the stored data can include the bounding box size to image scale mapping data ("mapping data." The mapping data maps size ranges of bounding boxes to scale amounts, e.g., scale factors. Mapping data may include, for example, data that maps bounding box sizes between forty and one hundred twenty pixels to an image scale of ⅓, bounding box sizes between one hundred twenty pixels and two hundred ten pixels to an image scale of ¼, and bounding box sizes between two hundred ten pixels and five hundred pixels to an image scale of ⅕.

The image scale selector 110 can determine the scale amount using the mapping data. The scale amount can be an image scale factor, e.g., a fraction by which the bounding box size is to be scaled. The mapping data may be based on experimental results that show improved robustness for bounding boxes of certain sizes and/or of certain size ranges. For example, experimental results may show improved robustness for bounding boxes with widths of seventy pixels. Therefore, the mapping data can be based on reducing bounding box sizes to widths of approximately seventy pixels. For a bounding box with a width of two hundred pixels, the image scale selector may select a scale amount of ¼ based on the mapping data. Applying the scale amount of ¼ generates a scaled frame with a bounding box having a width of fifty pixels.

The process 300 includes obtaining a second image of the scene captured by the camera after the first image was captured (308). The second image can be, for example, Frame 2. In some examples, the second image can be the next sequential image captured by the camera after the first image. In some examples, the second image can be the second sequential image captured by the camera after the first image, the third sequential image captured by the camera after the first image, etc. The second image may include one or more of the same human targets, e.g., the human target 122, as the first image. In some examples, the human target may move across the field of view between Frame 1 and Frame 2, e.g. from left to right. The human target moving across the field of view may occupy a similar pixel area of Frame 2 as in Frame 1. In some examples, the human target may move toward or away from the camera between Frame 1 and Frame 2. The human target moving toward the camera may occupy a larger pixel area of Frame 2 compared to Frame 1. The human target moving away from the camera may occupy a smaller pixel area of Frame 2 compared to Frame 1. The second image may also include images of background objects.

The process 300 can include scaling the first image and the second image by the scale amount. The bounding box can also be scaled by the scale amount to generate a first scaled bounding box. For example, the image scaler 112 can scale both Frame 1 and Frame 2 by a scale amount of ⅕. The bounding box will also be scaled by the scale amount of ⅕ to generate a first scaled bounding box. In this example, the first scaled bounding box is ⅕ the size of the bounding box.

For the example bounding box described above with a size of two hundred fifty by five hundred pixels, the scaled bounding box, scaled to ⅕, has a scaled size of fifty by one hundred pixels. Therefore, the number of pixels along the diagonal of the scaled bounding box is one hundred twelve pixels, and the area of the scaled bounding box is five thousand pixels.

The scale amount may be based on scaling the first bounding box to a scaled size that includes a particular density of feature points within the first scaled bounding box. For example, the scale amount may be based on scaling the first bounding box to a scaled size that includes a particular number of feature points per pixel, e.g., three feature points per forty pixels, three feature points per one hundred pixels, etc.

The particular density of feature points may include a particular range of the number of feature points per pixel within the first scaled bounding box. For example, the range of the number of feature points per pixel may be a range between two and five feature points per fifty pixels, between six and nine feature points per fifty pixels, between eleven and fifteen feature points per one hundred pixels, etc.

The scale amount may be based on a scaling the first bounding box to a scaled size that includes a particular quantity of feature points within the first scaled bounding box. For example, the scale amount may be based on scaling the first bounding box to a scaled size that includes ten feature points, thirteen feature points, twenty-five feature points, etc. within the first bounding box.

The particular quantity of feature points may include a particular range of the number of feature points within the first scaled bounding box. For example, the scale amount may be based on scaling the first bounding box to a scaled size that includes a range of ten to fifteen feature points, twelve to twenty feature points, thirty to fifty feature points, etc. within the first bounding box.

In some examples, the first image scaled by the scale amount and the second image scaled by the scale amount are each a fraction of the size of the first image. For example, Frame 1 may have a height of seven hundred fifty pixels. Frame 1 scaled by the scale amount of ⅕ therefore results in a scaled image height of one hundred fifty pixels. Frame 2 scaled by the scale amount may also have a height of one hundred fifty pixels, or of approximately one hundred fifty pixels. Thus, in this example, scaled Frame 1 and scaled Frame 2 are both a fraction of ⅕ the size of Frame 1, as measured along a height dimension.

The process 300 includes detecting the human in the second image based on both the first image scaled by the scale amount and the second image scaled by the scale amount (310).

Detecting the human in the second image can include identifying, within the bounding box, features of a feature point corresponding to the human detected in the first image. For example, features of the feature point can include one or more pixel values at or near a feature point corresponding to a part of the image of the human. For example, the pixel values can be pixel values for a square of pixels, a circle of pixels, or a rectangle of pixels near the feature point.

Detecting the human in the second image can include mapping the feature point to a coordinate of the first image. For example, the feature point can be mapped to a two dimensional coordinate, e.g., an x-y coordinate, of the first image.

Based on the features of the at least one feature point, and on the coordinate of the first image, the system can identify a corresponding feature point in the second image. For example, the feature point in the first image can be mapped to a feature point that has similar pixel values in the second image. In some examples, the feature point in the first image can be mapped to a feature point that is near a similar coordinate in the second image. In some examples, the feature point in the first image can be mapped to a feature point that has both similar pixel values, and a similar coordinate, in the second image.

Based on identifying the corresponding feature point in the second image, the system can detect the human in the second image. For example, detecting the human in the second image can include searching an area of the second image scaled by the scaled amount that corresponds with the bounding box of the first image scaled by the scale amount. The system can identify a second scaled bounding box around the human in the second image scaled by the scale amount. For example, the human tracker 114 can identify a second scaled bounding box around the human detected in scaled Frame 2. In some examples, the system can generate a bounding box around feature points in the scaled second image that map to feature points in the first image that correspond to the human detected in the first image.

Detecting the human in the second image can include applying a mask of feature points to the human detected in the first image, wherein the mask approximates a human shape. For example, the system can apply mask 202 to the human target 222 detected in the Frame A. The mask 202 includes feature points 216 and approximates a human shape.

The process 300 can include identifying, within the mask, at least one feature point corresponding to the human detected in the first image. The system can then map the at least one feature point to a two-dimensional coordinate of the first image. Based on the two-dimensional coordinate of the first image, the system can identify a feature point corresponding to the human in the second image that matches the feature point corresponding to the human in the first image. For example, the feature point in the second image may have similar pixel values to the feature point in the first image. The feature point in the second image may also have a similar coordinate location to the feature point in the first image. Based on identifying the matching feature point in the second image, the system can detect the human in the second image. For example, the system can generate a scaled bounding box around the human in the second image.

In some examples, the mask approximates a shape of a human torso or a shape of a standing human. For example, the mask 202 approximates a shape of a standing human. The mask 204 approximates a shape of a human torso.

In some examples, the mask occupies an area of the bounding box. Portions of the bounding box that are not within the area of the mask do not include feature points. For example, the mask 232 occupies an area of the bounding box 226. Portions of the bounding box 226 that are not within the area of the mask 232 do not include feature points. For examples, portions of the bounding box 226 that are located between the outline of the mask 232 and the outline of the bounding box 226 do not include feature points.

The doorbell camera can scale the first image, e.g., Frame 1, and the second image, e.g., Frame 2, by the scale amount using an image scaler, e.g., the image scaler 112. The image scaler can apply the scale amount, e.g., ¼, to both Frame 1 and Frame 2. The image scaler can output the scaled Frame 1 and the scaled Frame 2 to a human tracker, e.g., the human tracker 114. The human tracker can detect the human target in Frame 2 based on the scaled Frame 1 and the scaled Frame 2. For example, the human tracker can search the area of scaled Frame 2 that corresponds with the scaled bounding box of scaled Frame 1 for the human target. The human tracker can identify a bounding box around the human target in scaled Frame 2.

Detecting the human in the second image based on the first image scaled by the scaled amount and the second image scaled by the scale amount may be more accurate than detecting the human in an unscaled second image. For example, accuracy of tracking a human between a first frame and a second frame can be measured by robustness. Robustness is based on a failure rate of the tracker during a length of time. Detecting the human in scaled Frame 2 results in greater robustness compared to detecting the human in unscaled Frame 2. Thus, tracking the human between the first scaled image and the second scaled image can improve accuracy of the human tracking system.

Figure 4:
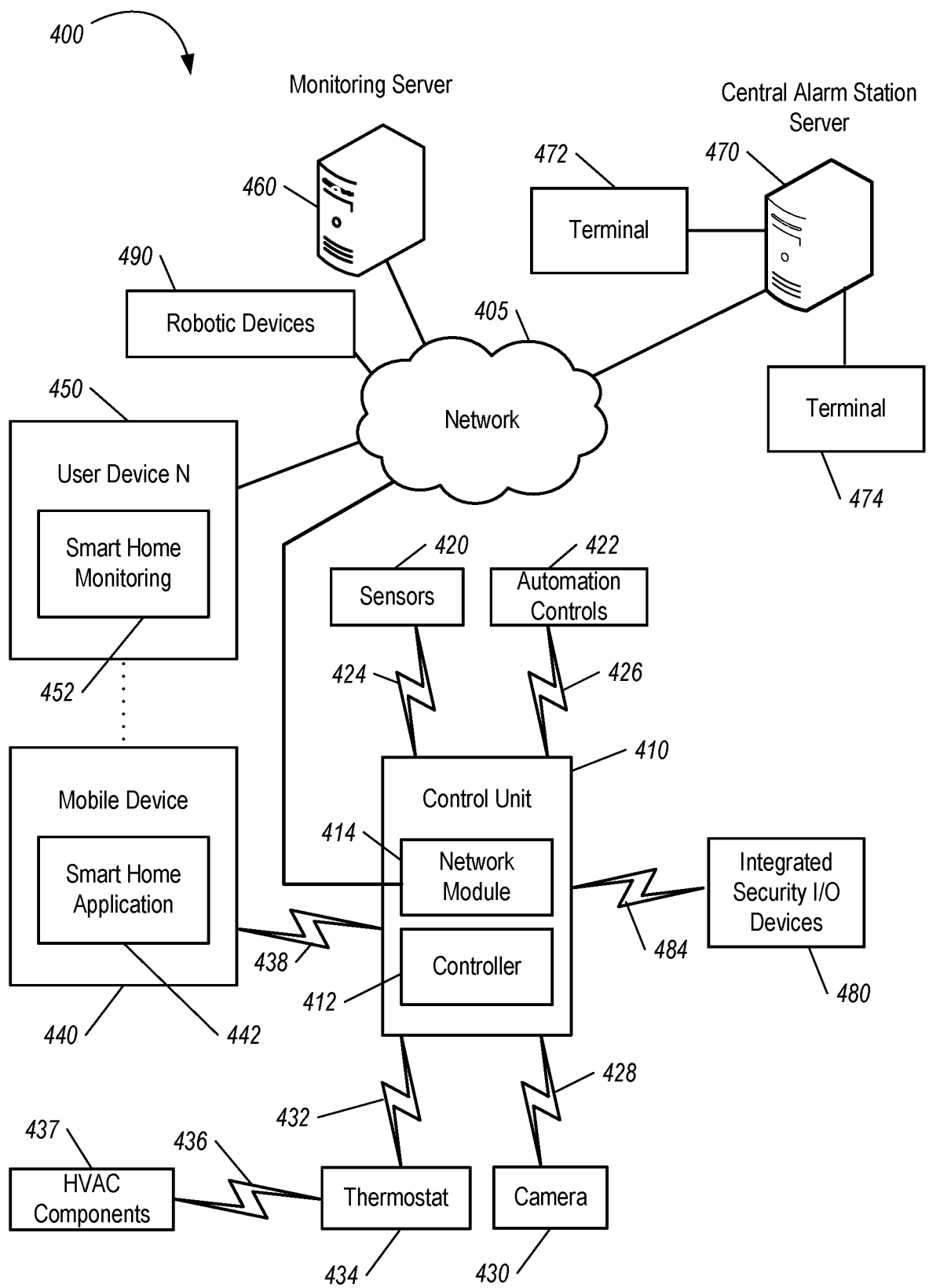
FIG. 4 is a diagram illustrating an example of a home monitoring system.

FIG. 4 is a diagram illustrating an example of a home monitoring system 400. The monitoring system 400 includes a network 405, a control unit 410, one or more user devices 440 and 450, a monitoring server 460, and a central alarm station server 470. In some examples, the network 405 facilitates communications between the control unit 410, the one or more user devices 440 and 450, the monitoring server 460, and the central alarm station server 470.

The network 405 is configured to enable exchange of electronic communications between devices connected to the network 405. For example, the network 405 may be configured to enable exchange of electronic communications between the control unit 410, the one or more user devices 440 and 450, the monitoring server 460, and the central alarm station server 470. The network 405 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. Network 405 may include multiple networks or subnetworks, each of which may include, for example, a wired or wireless data pathway. The network 405 may include a circuit-switched network, a packet-switched data network, or any other network able to carry electronic communications (e.g., data or voice communications). For example, the network 405 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 405 may include one or more networks that include wireless data channels and wireless voice channels. The network 405 may be a wireless network, a broadband network, or a combination of networks including a wireless network and a broadband network.

The control unit 410 includes a controller 412 and a network module 414. The controller 412 is configured to control a control unit monitoring system (e.g., a control unit system) that includes the control unit 410. In some examples, the controller 412 may include a processor or other control circuitry configured to execute instructions of a program that controls operation of a control unit system. In these examples, the controller 412 may be configured to receive input from sensors, flow meters, or other devices included in the control unit system and control operations of devices included in the household (e.g., speakers, lights, doors, etc.). For example, the controller 412 may be configured to control operation of the network module 414 included in the control unit 410.

The network module 414 is a communication device configured to exchange communications over the network 405. The network module 414 may be a wireless communication module configured to exchange wireless communications over the network 405. For example, the network module 414 may be a wireless communication device configured to exchange communications over a wireless data channel and a wireless voice channel. In this example, the network module 414 may transmit alarm data over a wireless data channel and establish a two-way voice communication session over a wireless voice channel. The wireless communication device may include one or more of a LTE module, a GSM module, a radio modem, cellular transmission module, or any type of module configured to exchange communications in one of the following formats: LTE, GSM or GPRS, CDMA, EDGE or EGPRS, EV-DO or EVDO, UMTS, or IP.

The network module 414 also may be a wired communication module configured to exchange communications over the network 405 using a wired connection. For instance, the network module 414 may be a modem, a network interface card, or another type of network interface device. The network module 414 may be an Ethernet network card configured to enable the control unit 410 to communicate over a local area network and/or the Internet. The network module 414 also may be a voice band modem configured to enable the alarm panel to communicate over the telephone lines of Plain Old Telephone Systems (POTS).

The control unit system that includes the control unit 410 includes one or more sensors. For example, the monitoring system may include multiple sensors 420. The sensors 420 may include a doorbell camera, lock sensor, a contact sensor, a motion sensor, or any other type of sensor included in a control unit system. The sensors 420 also may include an environmental sensor, such as a temperature sensor, a water sensor, a rain sensor, a wind sensor, a light sensor, a smoke detector, a carbon monoxide detector, an air quality sensor, etc. The sensors 420 further may include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the health-monitoring sensor can be a wearable sensor that attaches to a user in the home. The health-monitoring sensor can collect various health data, including pulse, heart rate, respiration rate, sugar or glucose level, bodily temperature, or motion data.

The sensors 420 can also include a radio-frequency identification (RFID) sensor that identifies a particular article that includes a pre-assigned RFID tag.

The control unit 410 communicates with the home automation controls 422 and a camera 430 to perform monitoring. The home automation controls 422 are connected to one or more devices that enable automation of actions in the home. For instance, the home automation controls 422 may be connected to one or more lighting systems and may be configured to control operation of the one or more lighting systems. In addition, the home automation controls 422 may be connected to one or more electronic locks at the home and may be configured to control operation of the one or more electronic locks (e.g., control Z-Wave locks using wireless communications in the Z-Wave protocol). Further, the home automation controls 422 may be connected to one or more appliances at the home and may be configured to control operation of the one or more appliances. The home automation controls 422 may include multiple modules that are each specific to the type of device being controlled in an automated manner. The home automation controls 422 may control the one or more devices based on commands received from the control unit 410. For instance, the home automation controls 422 may cause a lighting system to illuminate an area to provide a better image of the area when captured by a camera 430.

The camera 430 may be a video/photographic camera or other type of optical sensing device configured to capture images. For instance, the camera 430 may be configured to capture images of an area within a building or home monitored by the control unit 410. The camera 430 may be configured to capture single, static images of the area and also video images of the area in which multiple images of the area are captured at a relatively high frequency (e.g., thirty images per second). The camera 430 may be controlled based on commands received from the control unit 410.

The camera 430 may be triggered by several different types of techniques. For instance, a Passive Infra-Red (PIR) motion sensor may be built into the camera 430 and used to trigger the camera 430 to capture one or more images when motion is detected. The camera 430 also may include a microwave motion sensor built into the camera and used to trigger the camera 430 to capture one or more images when motion is detected. The camera 430 may have a "normally open" or "normally closed" digital input that can trigger capture of one or more images when external sensors (e.g., the sensors 420, PIR, door/window, etc.) detect motion or other events. In some implementations, the camera 430 receives a command to capture an image when external devices detect motion or another potential alarm event. The camera 430 may receive the command from the controller 412 or directly from one of the sensors 420.

In some examples, the camera 430 triggers integrated or external illuminators (e.g., Infra-Red, Z-wave controlled "white" lights, lights controlled by the home automation controls 422, etc.) to improve image quality when the scene is dark. An integrated or separate light sensor may be used to determine if illumination is desired and may result in increased image quality.

The camera 430 may be programmed with any combination of time/day schedules, system "arming state", or other variables to determine whether images should be captured or not when triggers occur. The camera 430 may enter a low-power mode when not capturing images. In this case, the camera 430 may wake periodically to check for inbound messages from the controller 412. The camera 430 may be powered by internal, replaceable batteries if located remotely from the control unit 410. The camera 430 may employ a small solar cell to recharge the battery when light is available. Alternatively, the camera 430 may be powered by the controller's 412 power supply if the camera 430 is co-located with the controller 412.

In some implementations, the camera 430 communicates directly with the monitoring server 460 over the Internet. In these implementations, image data captured by the camera 430 does not pass through the control unit 410 and the camera 430 receives commands related to operation from the monitoring server 460.

The system 400 also includes thermostat 434 to perform dynamic environmental control at the home. The thermostat 434 is configured to monitor temperature and/or energy consumption of an HVAC system associated with the thermostat 434, and is further configured to provide control of environmental (e.g., temperature) settings. In some implementations, the thermostat 434 can additionally or alternatively receive data relating to activity at a home and/or environmental data at a home, e.g., at various locations indoors and outdoors at the home. The thermostat 434 can directly measure energy consumption of the HVAC system associated with the thermostat, or can estimate energy consumption of the HVAC system associated with the thermostat 434, for example, based on detected usage of one or more components of the HVAC system associated with the thermostat 434. The thermostat 434 can communicate temperature and/or energy monitoring information to or from the control unit 410 and can control the environmental (e.g., temperature) settings based on commands received from the control unit 410.

In some implementations, the thermostat 434 is a dynamically programmable thermostat and can be integrated with the control unit 410. For example, the dynamically programmable thermostat 434 can include the control unit 410, e.g., as an internal component to the dynamically programmable thermostat 434. In addition, the control unit 410 can be a gateway device that communicates with the dynamically programmable thermostat 434. In some implementations, the thermostat 434 is controlled via one or more home automation controls 422.

A module 437 is connected to one or more components of an HVAC system associated with a home, and is configured to control operation of the one or more components of the HVAC system. In some implementations, the module 437 is also configured to monitor energy consumption of the HVAC system components, for example, by directly measuring the energy consumption of the HVAC system components or by estimating the energy usage of the one or more HVAC system components based on detecting usage of components of the HVAC system. The module 437 can communicate energy monitoring information and the state of the HVAC system components to the thermostat 434 and can control the one or more components of the HVAC system based on commands received from the thermostat 434.

The system 400 further includes one or more integrated security devices 480. The one or more integrated security devices may include any type of device used to provide alerts based on received sensor data. For instance, the one or more control units 410 may provide one or more alerts to the one or more integrated security input/output devices 480. Additionally, the one or more control units 410 may receive one or more sensor data from the sensors 420 and determine whether to provide an alert to the one or more integrated security input/output devices 480.

The sensors 420, the home automation controls 422, the camera 430, the thermostat 434, and the integrated security devices 480 may communicate with the controller 412 over communication links 424, 426, 428, 432, 438, and 484. The communication links 424, 426, 428, 432, 438, and 484 may be a wired or wireless data pathway configured to transmit signals from the sensors 420, the home automation controls 422, the camera 430, the thermostat 434, and the integrated security devices 480 to the controller 412. The sensors 420, the home automation controls 422, the camera 430, the thermostat 434, and the integrated security devices 480 may continuously transmit sensed values to the controller 412, periodically transmit sensed values to the controller 412, or transmit sensed values to the controller 412 in response to a change in a sensed value.

The communication links 424, 426, 428, 432, 438, and 484 may include a local network. The sensors 420, the home automation controls 422, the camera 430, the thermostat 434, and the integrated security devices 480, and the controller 412 may exchange data and commands over the local network. The local network may include 802.11 "Wi-Fi" wireless Ethernet (e.g., using low-power Wi-Fi chipsets), Z-Wave, Zigbee, Bluetooth, "Homeplug" or other "Powerline" networks that operate over AC wiring, and a Category 5 (CAT5) or Category 6 (CAT6) wired Ethernet network. The local network may be a mesh network constructed based on the devices connected to the mesh network.

The monitoring server 460 is an electronic device configured to provide monitoring services by exchanging electronic communications with the control unit 410, the one or more user devices 440 and 450, and the central alarm station server 470 over the network 405. For example, the monitoring server 460 may be configured to monitor events generated by the control unit 410. In this example, the monitoring server 460 may exchange electronic communications with the network module 414 included in the control unit 410 to receive information regarding events detected by the control unit 410. The monitoring server 460 also may receive information regarding events from the one or more user devices 440 and 450.

In some examples, the monitoring server 460 may route alert data received from the network module 414 or the one or more user devices 440 and 450 to the central alarm station server 470. For example, the monitoring server 460 may transmit the alert data to the central alarm station server 470 over the network 405.

The monitoring server 460 may store sensor and image data received from the monitoring system and perform analysis of sensor and image data received from the monitoring system. Based on the analysis, the monitoring server 460 may communicate with and control aspects of the control unit 410 or the one or more user devices 440 and 450.

The monitoring server 460 may provide various monitoring services to the system 400. For example, the monitoring server 460 may analyze the sensor, image, and other data to determine an activity pattern of a resident of the home monitored by the system 400. In some implementations, the monitoring server 460 may analyze the data for alarm conditions or may determine and perform actions at the home by issuing commands to one or more of the controls 422, possibly through the control unit 410.

The monitoring server 460 can be configured to provide information (e.g., activity patterns) related to one or more residents of the home monitored by the system 400 (e.g., user 108). For example, one or more of the sensors 420, the home automation controls 422, the camera 430, the thermostat 434, and the integrated security devices 480 can collect data related to a resident including location information (e.g., if the resident is home or is not home) and provide location information to the thermostat 434.

The central alarm station server 470 is an electronic device configured to provide alarm monitoring service by exchanging communications with the control unit 410, the one or more user devices 440 and 450, and the monitoring server 460 over the network 405. For example, the central alarm station server 470 may be configured to monitor alerting events generated by the control unit 410. In this example, the central alarm station server 470 may exchange communications with the network module 414 included in the control unit 410 to receive information regarding alerting events detected by the control unit 410. The central alarm station server 470 also may receive information regarding alerting events from the one or more user devices 440 and 450 and/or the monitoring server 460.

The central alarm station server 470 is connected to multiple terminals 472 and 474. The terminals 472 and 474 may be used by operators to process alerting events. For example, the central alarm station server 470 may route alerting data to the terminals 472 and 474 to enable an operator to process the alerting data. The terminals 472 and 474 may include general-purpose computers (e.g., desktop personal computers, workstations, or laptop computers) that are configured to receive alerting data from a server in the central alarm station server 470 and render a display of information based on the alerting data. For instance, the controller 412 may control the network module 414 to transmit, to the central alarm station server 470, alerting data indicating that a sensor 420 detected motion from a motion sensor via the sensors 420. The central alarm station server 470 may receive the alerting data and route the alerting data to the terminal 472 for processing by an operator associated with the terminal 472. The terminal 472 may render a display to the operator that includes information associated with the alerting event (e.g., the lock sensor data, the motion sensor data, the contact sensor data, etc.) and the operator may handle the alerting event based on the displayed information.

In some implementations, the terminals 472 and 474 may be mobile devices or devices designed for a specific function. Although FIG. 4 illustrates two terminals for brevity, actual implementations may include more (and, perhaps, many more) terminals.

The one or more authorized user devices 440 and 450 are devices that host and display user interfaces. For instance, the user device 440 is a mobile device that hosts or runs one or more native applications (e.g., the home monitoring application 442). The user device 440 may be a cellular phone or a non-cellular locally networked device with a display. The user device 440 may include a cell phone, a smart phone, a tablet PC, a personal digital assistant ("PDA"), or any other portable device configured to communicate over a network and display information. For example, implementations may also include Blackberry-type devices (e.g., as provided by Research in Motion), electronic organizers, iPhone-type devices (e.g., as provided by Apple), iPod devices (e.g., as provided by Apple) or other portable music players, other communication devices, and handheld or portable electronic devices for gaming, communications, and/or data organization. The user device 440 may perform functions unrelated to the monitoring system, such as placing personal telephone calls, playing music, playing video, displaying pictures, browsing the Internet, maintaining an electronic calendar, etc.

The user device 440 includes a home monitoring application 452. The home monitoring application 442 refers to a software/firmware program running on the corresponding mobile device that enables the user interface and features described throughout. The user device 440 may load or install the home monitoring application 442 based on data received over a network or data received from local media. The home monitoring application 442 runs on mobile devices platforms, such as iPhone, iPod touch, Blackberry, Google Android, Windows Mobile, etc. The home monitoring application 442 enables the user device 440 to receive and process image and sensor data from the monitoring system.

The user device 440 may be a general-purpose computer (e.g., a desktop personal computer, a workstation, or a laptop computer) that is configured to communicate with the monitoring server 460 and/or the control unit 410 over the network 405. The user device 440 may be configured to display a smart home user interface 452 that is generated by the user device 440 or generated by the monitoring server 460. For example, the user device 440 may be configured to display a user interface (e.g., a web page) provided by the monitoring server 460 that enables a user to perceive images captured by the camera 430 and/or reports related to the monitoring system. Although FIG. 4 illustrates two user devices for brevity, actual implementations may include more (and, perhaps, many more) or fewer user devices.

In some implementations, the one or more user devices 440 and 450 communicate with and receive monitoring system data from the control unit 410 using the communication link 438. For instance, the one or more user devices 440 and 450 may communicate with the control unit 410 using various local wireless protocols such as Wi-Fi, Bluetooth, Z-wave, Zigbee, HomePlug (ethernet over power line), or wired protocols such as Ethernet and USB, to connect the one or more user devices 440 and 450 to local security and automation equipment. The one or more user devices 440 and 450 may connect locally to the monitoring system and its sensors and other devices. The local connection may improve the speed of status and control communications because communicating through the network 405 with a remote server (e.g., the monitoring server 460) may be significantly slower.

Although the one or more user devices 440 and 450 are shown as communicating with the control unit 410, the one or more user devices 440 and 450 may communicate directly with the sensors and other devices controlled by the control unit 410. In some implementations, the one or more user devices 440 and 450 replace the control unit 410 and perform the functions of the control unit 410 for local monitoring and long range/offsite communication.

In other implementations, the one or more user devices 440 and 450 receive monitoring system data captured by the control unit 410 through the network 405. The one or more user devices 440, 450 may receive the data from the control unit 410 through the network 405 or the monitoring server 460 may relay data received from the control unit 410 to the one or more user devices 440 and 450 through the network 405. In this regard, the monitoring server 460 may facilitate communication between the one or more user devices 440 and 450 and the monitoring system.

In some implementations, the one or more user devices 440 and 450 may be configured to switch whether the one or more user devices 440 and 450 communicate with the control unit 410 directly (e.g., through link 438) or through the monitoring server 460 (e.g., through network 405) based on a location of the one or more user devices 440 and 450. For instance, when the one or more user devices 440 and 450 are located close to the control unit 410 and in range to communicate directly with the control unit 410, the one or more user devices 440 and 450 use direct communication. When the one or more user devices 440 and 450 are located far from the control unit 410 and not in range to communicate directly with the control unit 410, the one or more user devices 440 and 450 use communication through the monitoring server 460.

Although the one or more user devices 440 and 450 are shown as being connected to the network 405, in some implementations, the one or more user devices 440 and 450 are not connected to the network 405. In these implementations, the one or more user devices 440 and 450 communicate directly with one or more of the monitoring system components and no network (e.g., Internet) connection or reliance on remote servers is needed.

In some implementations, the one or more user devices 440 and 450 are used in conjunction with only local sensors and/or local devices in a house. In these implementations, the system 400 includes the one or more user devices 440 and 450, the sensors 420, the home automation controls 422, the camera 430, and robotic devices 490. The one or more user devices 440 and 450 receive data directly from the sensors 420, the home automation controls 422, the camera 430, and the robotic devices 490, and sends data directly to the sensors 420, the home automation controls 422, the camera 430, and the robotic devices 490. The one or more user devices 440, 450 provide the appropriate interfaces/processing to provide visual surveillance and reporting.

In other implementations, the system 400 further includes network 405 and the sensors 420, the home automation controls 422, the camera 430, the thermostat 434, and the robotic devices 490, and are configured to communicate sensor and image data to the one or more user devices 440 and 450 over network 405 (e.g., the Internet, cellular network, etc.). In yet another implementation, the sensors 420, the home automation controls 422, the camera 430, the thermostat 434, and the robotic devices 490 (or a component, such as a bridge/router) are intelligent enough to change the communication pathway from a direct local pathway when the one or more user devices 440 and 450 are in close physical proximity to the sensors 420, the home automation controls 422, the camera 430, the thermostat 434, and the robotic devices 490 to a pathway over network 405 when the one or more user devices 440 and 450 are farther from the sensors 420, the home automation controls 422, the camera 430, the thermostat 434, and the robotic devices 490.

In some examples, the system leverages GPS information from the one or more user devices 440 and 450 to determine whether the one or more user devices 440 and 450 are close enough to the sensors 420, the home automation controls 422, the camera 430, the thermostat 434, and the robotic devices 490 to use the direct local pathway or whether the one or more user devices 440 and 450 are far enough from the sensors 420, the home automation controls 422, the camera 430, the thermostat 434, and the robotic devices 490 that the pathway over network 405 is required.

In other examples, the system leverages status communications (e.g., pinging) between the one or more user devices 440 and 450 and the sensors 420, the home automation controls 422, the camera 430, the thermostat 434, and the robotic devices 490 to determine whether communication using the direct local pathway is possible. If communication using the direct local pathway is possible, the one or more user devices 440 and 450 communicate with the sensors 420, the home automation controls 422, the camera 430, the thermostat 434, and the robotic devices 490 using the direct local pathway. If communication using the direct local pathway is not possible, the one or more user devices 440 and 450 communicate with the sensors 420, the home automation controls 422, the camera 430, the thermostat 434, and the robotic devices 490 using the pathway over network 405.

In some implementations, the system 400 provides end users with access to images captured by the camera 430 to aid in decision making. The system 400 may transmit the images captured by the camera 430 over a wireless WAN network to the user devices 440 and 450. Because transmission over a wireless WAN network may be relatively expensive, the system 400 can use several techniques to reduce costs while providing access to significant levels of useful visual information (e.g., compressing data, down-sampling data, sending data only over inexpensive LAN connections, or other techniques).

In some implementations, a state of the monitoring system and other events sensed by the monitoring system may be used to enable/disable video/image recording devices (e.g., the camera 430). In these implementations, the camera 430 may be set to capture images on a periodic basis when the alarm system is armed in an "away" state, but set not to capture images when the alarm system is armed in a "home" state or disarmed. In addition, the camera 430 may be triggered to begin capturing images when the alarm system detects an event, such as an alarm event, a door-opening event for a door that leads to an area within a field of view of the camera 430, or motion in the area within the field of view of the camera 430. In other implementations, the camera 430 may capture images continuously, but the captured images may be stored or transmitted over a network when needed.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device.

Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially designed ASICs (application-specific integrated circuits).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

What is claimed is:

1. A method, comprising:
generating a bounding box around an object detected in a first image captured by a camera;
determining a scale amount using a size of the bounding box;
scaling, by the scale amount, a second image captured by the camera; and
detecting the object in the second image scaled by the scale amount.

2. The method of claim 1, wherein detecting the object in the second image scaled by the scale amount comprises:
identifying, within the bounding box, a feature point corresponding to the object detected in the first image scaled by the scale amount; and
identifying a corresponding feature point in the second image scaled by the scale amount.

3. The method of claim 2, comprising identifying the corresponding feature point in the second image scaled by the scale amount based on a similarity of pixel values between the feature point in the first image scaled by the scale amount and the feature point in the second image scaled by the scale amount.

4. The method of claim 1, wherein determining the scale amount using the size of the bounding box comprises:
accessing stored data that associates bounding box sizes to respective scale amounts; and
using the stored data, selecting the scale amount associated with the size of the bounding box.

5. The method of claim 1, wherein detecting the object in the second image comprises:
searching an area of the second image scaled by the scale amount that corresponds to the bounding box of the first image scaled by the scale amount; and
identifying a second bounding box around the object in the second image scaled by the scale amount.

6. The method of claim 1, wherein the scale amount is based on scaling the bounding box to a scaled size that includes a particular density of feature points within the scaled bounding box.

7. The method of claim 6, wherein the particular density of feature points comprises a particular range of a number of feature points per pixel within the scaled bounding box.

8. The method of claim 1, wherein the scale amount is based on a scaling the bounding box to a scaled size that includes a particular quantity of feature points within the scaled bounding box.

9. The method of claim 8, wherein the particular quantity of feature points comprises a particular range of a number of feature points within the scaled bounding box.

10. The method of claim 1, wherein the object comprises a human.

11. A method, comprising
determining a range of shape sizes for tracking object movement in images;
determining a first size of a shape around an object detected in a first image, the first size being outside of the range of shape sizes;
scaling the first image by a scale amount to reduce the shape from the first size to a second size that is within the range of shape sizes;
scaling a second image by the scale amount; and
tracking object movement between the first image scaled by the scale amount and the second image scaled by the scale amount.

12. The method of claim 11, wherein the shape encompasses feature points, and the range of shape sizes includes shape sizes that encompass a quantity of feature points within a particular range of quantities.

13. The method of claim 11, wherein a shape encompasses feature points, and the range of shape sizes includes shape sizes that encompass a density of feature points within a particular range of densities.

14. The method of claim 13, wherein a density of feature points comprises a number of feature points per pixel.

15. The method of claim 11, wherein a shape size comprises at least one of a number of pixels along a first dimension or a number of pixels along a second dimension of the shape.

16. The method of claim 11, wherein the object has an object shape, and the shape approximates the object shape.

17. The method of claim 16, wherein the object shape comprises a shape of a human torso or a shape of a standing human body.

18. The method of claim 11, wherein tracking object movement between the first image scaled by the scale amount and the second image scaled by the scale amount comprises:
identifying, within the shape, a feature point corresponding to the object detected in the first image scaled by the scale amount; and
identifying a corresponding feature point in the second image scaled by the scale amount.

19. The method of claim 18, comprising identifying the corresponding feature point in the second image scaled by the scale amount based on a similarity of pixel values between the feature point in the first image scaled by the scale amount and the feature point in the second image scaled by the scale amount.

20. The method of claim 11, wherein the object comprises a human.

* * * * *